United States Patent [19]

Rootham

[11] Patent Number: 5,764,717
[45] Date of Patent: Jun. 9, 1998

[54] CHEMICAL CLEANING METHOD FOR THE REMOVAL OF SCALE SLUDGE AND OTHER DEPOSITS FROM NUCLEAR STEAM GENERATORS

[75] Inventor: Michael W. Rootham, Pittsburgh, Pa.

[73] Assignee: Westinghouse Electric Corporation, Pittsburgh, Pa.

[21] Appl. No.: 521,059

[22] Filed: Aug. 29, 1995

[51] Int. Cl.$^6$ .............................. B08B 3/12; B08B 7/04; F28G 13/00

[52] U.S. Cl. .............................. 376/316; 134/1; 134/10; 165/95; 252/390; 376/310

[58] Field of Search .............................. 252/390, 392, 252/394; 376/308–316, 376; 422/14, 16; 134/1, 10, 17, 21, 22.11, 22.12; 165/95; 166/244.1, 310–312, 371; 122/379, 382, 392

[56] References Cited

U.S. PATENT DOCUMENTS

| | | | |
|---|---|---|---|
| 3,684,720 | 8/1972 | Richardson | 507/241 |
| 4,079,701 | 3/1978 | Hickman et al. | 122/382 |
| 4,273,076 | 6/1981 | Lahoda et al. | 122/382 |
| 4,276,856 | 7/1981 | Dent et al. | 122/382 |
| 4,526,135 | 7/1985 | Calhoun et al. | 122/382 |
| 4,562,042 | 12/1985 | Moran | 422/3 |
| 4,576,123 | 3/1986 | Lahoda et al. | 122/382 |
| 4,676,201 | 6/1987 | Lahoda et al. | 122/392 |
| 4,699,665 | 10/1987 | Scharton et al. | 134/1 |
| 4,899,697 | 2/1990 | Franklin et al. | 122/379 |
| 4,921,662 | 5/1990 | Franklin et al. | 376/316 |
| 4,972,805 | 11/1990 | Weems | 122/383 |
| 5,006,304 | 4/1991 | Franklin et al. | 376/316 |
| 5,019,329 | 5/1991 | Franklin et al. | 376/316 |
| 5,069,172 | 12/1991 | Shirey et al. | 122/382 |
| 5,092,280 | 3/1992 | Franklin et al. | 122/379 |
| 5,092,355 | 3/1992 | Cadwell et al. | 134/1 |
| 5,154,197 | 10/1992 | Auld et al. | 134/1 |
| 5,183,573 | 2/1993 | Kreh et al. | 210/697 |
| 5,190,656 | 3/1993 | Paul et al. | 210/643 |
| 5,194,223 | 3/1993 | Moulton et al. | 422/16 |
| 5,200,105 | 4/1993 | Cuisia | 252/180 |
| 5,242,599 | 9/1993 | Chen et al. | 210/697 |
| 5,288,410 | 2/1994 | Cuisia | 210/699 |
| 5,322,635 | 6/1994 | Hleatt et al. | 252/82 |
| 5,360,550 | 11/1994 | Clubley et al. | 210/699 |
| 5,368,775 | 11/1994 | Rossi et al. | 252/392 |
| 5,409,614 | 4/1995 | Gallup et al. | 210/700 |

*Primary Examiner*—Michael J. Carone
*Assistant Examiner*—Matthew J. Lattig

[57] ABSTRACT

An improved method for removing scale, sludge, corrosion and other debris and deposits from the interior of a heat exchanger vessel such as a nuclear steam generator, includes generating pressure pulses in a non-corrosive, strongly basic, amine-containing chemical cleaning agent in aqueous solution after the agent has been introduced into the interior of the vessel to create shock waves in the liquid for dislodging, dissolving and fluidizing sludge and corrosion products. The chemical cleaning agent is an aqueous solution containing at least one of the group of lower alkyl amines, e.g., dimethylamine, ethylamine, 1,2-diaminoethane, or diaminopropane, lower alkanol amines, e.g., ethanolamine, 2-methyl-2-amino-1-propanol, and 5-aminopentanol, lower alkoxy alkyl amines, e.g., 3-methoxypropylamine, and cyclic diimines, e.g., 1,10-phenanthroline, 2,9-dimethyl-1,10-phenanthroline, 4,7-dimethyl-1,10-phenanthroline, 2,2'-bipyridine, and 4,4'-bipyridine, and terpyridine, or combinations thereof. The method further includes simultaneously recirculating the chemical cleaning agent through a filter assembly during the pressure pulsing operation in order to remove fluidized sludge and corrosion products dislodged by the pressure pulsing and chemical action, thereby affording them no opportunity to resettle back onto the surfaces of the heat exchanger vessel and interfere with the chemical cleaning of the vessel. The method reduces not only the time required for a particular chemical cleaning agent to effectively clean the vessel, but further reduces the number of times such chemicals need to be introduced into the vessel, which in turn results in the production of less radioactive liquid waste products, and minimizes new corrosion through use of relatively non-corrosive cleaning agents.

20 Claims, 4 Drawing Sheets

CHEMICAL CLEANING METHOD FOR THE REMOVAL OF SCALE SLUDGE AND OTHER DEPOSITS FROM NUCLEAR STEAM GENERATORS

1. FIELD OF THE INVENTION

This invention generally relates to a method for the removal of scale, sludge, corrosion and other deposits from heat transfer equipment surfaces, such as in boilers and heat exchangers in steam generation systems, which surfaces are in contact with aqueous systems. More particularly the invention relates to an improved method for the removal of scale, sludge, corrosion and other deposits from the interior surfaces of heat exchanger vessels, in particular, the interior of the secondary side of nuclear steam generators, by treating the scale and other deposits with aqueous solutions containing water soluble, strongly basic amines to dislodge, dissolve and fluidize, the scale and other deposits. The invention is particularly useful during off-line nuclear steam generator cleaning operations including pressure pulse cleaning operations and bundle flush followed by inert gas sparging cleaning operations.

2. BACKGROUND OF THE INVENTION

Pressure pulse and chemical methods are known for cleaning the interior of heat exchanger vessels such as the secondary sides of nuclear steam generators. U.S. Pat. Nos. 4,899,697 (Franklin, et al.), 4,921,662 (Franklin, et al.), 5,006,304 (Franklin, et al.), 5,092,280 (Franklin, et al.), and 5,092,355 (Cadwell, et al.) each disclose pressure pulse cleaning methods and devices to loosen and remove sludge and debris from heat exchanger surfaces at the secondary side of nuclear steam generators by introducing shock waves in water. U.S. Pat. No. 5,019,329 (Franklin, et al.) discloses an improved cleaning method for the secondary side of nuclear steam generators by means of vertically flushing the secondary side of nuclear steam generators during pressure pulse or other shock wave type cleaning operations. U.S. Pat. No. 5,154,197 (Auld, et al.) discloses a chemically assisted pressure pulse cleaning method for removing sludge and corrosion products from the interior of heat exchanger vessels in the secondary side of nuclear steam generators by introducing pressure pulses to cause shock waves within a liquid chelate-containing chemical cleaning agent.

Before the purpose and operation of such cleaning methods can be appreciated, a basic understanding of the structure and maintenance problems associated with nuclear steam generators is necessary. Nuclear steam generators generally comprise a bowl-shaped primary side through which hot, radioactive water from the reactor core is circulated, a secondary side disposed over the primary side into which non-radioactive water is fed, and a tubesheet which includes a number of U-shaped heat exchanger tubes disposed between the primary and secondary sides of the generator for thermally connecting but hydraulically isolating the primary and secondary sides. Heat from the radioactively contaminated water in the primary side is conducted to the non-radioactive water in the secondary side, thereby causing it to boil and to create non-radioactive steam for electrical power generation.

The U-shaped heat exchanger tubes are contained in the secondary side of the nuclear steam generator. Each heat exchanger tube is inverted, with its open ends mounted in the tubesheet and its legs and bent U-portion extending into the secondary side. A plurality of vertically spaced support plates are provided in the secondary side for laterally supporting the legs of each heat exchanger tube. The legs of the U-shaped heat exchanger tubes extend through bores in the support plates.

Small annular clearance spaces are present between the heat exchanger tubes and the bores in the support plates and tubesheet through which the tubes extend.

These annular spaces are known in the art as "crevice regions." Crevice regions provide only a very limited flow path for feed water that circulates through the secondary side of the steam generator. The reduced flow of water through the crevice regions results in a phenomenon known as "dry boiling" wherein the feed water is apt to boil so rapidly at the crevice regions that they can actually dry out for brief periods of time before becoming again immersed in feed water. This repeated drying-out causes impurities dissolved in the water to plate or precipitate out and over time to collect in the crevice regions. These precipitates create scale, sludge, corrosion and other debris on the exterior surfaces of the heat exchanger tubes, that can accumulate over time and obstruct the flow of feed water in the secondary side of the steam generator as well as reduce the heat transfer rate to an extent where the efficiency and steam output of the generator are seriously compromised. Moreover, scale, sludge and other debris promotes stress corrosion cracking in crevice regions of the heat exchanger tubes and also in the free span region of the heat exchanger tubes which, if not arrested, will ultimately allow water from the primary side of the steam generator to radioactively contaminate the water in the secondary side of the generator. Thus, it is extremely important that maintenance operations are employed which prevent such scale, sludge and corrosion deposits from causing heat transfer losses and radioactive contamination of the feed water.

Chemical cleaning methods were developed in the prior art to dissolve such scale and sludge accumulation, and to ameliorate corrosion. In one of these methods, the nuclear steam generator is first taken out of service and completely drained of water from both the primary and secondary sides. Next, whereas most of the corrosion products contained in the crevice region and tube scales are iron oxide and copper and that have become tightly ensconced in the crevice regions or on the surfaces of the heat exchanger tubes, chelate-containing iron and copper removal solvents are sequentially introduced into the interior side to dissolve and remove the impurities. Such iron removal solvents typically include an aqueous mixture of ethylenediamine tetraacetic acid (EDTA), hydrazine, ammonium hydroxide, and an inhibitor for retarding corrosion reactions between the metal surfaces in the generator and EDTA. The copper solvent likewise includes an aqueous mixture of EDTA, ammonium hydroxide, and further includes hydrogen peroxide and ethylene diamine (EDA).

While such copper and iron solvents have proven to be effective in removing iron oxide and copper deposits from the interior of the secondary side of such generators, they are also capable of promoting new corrosion within the steam generator despite the use of an inhibitor, particularly among the carbon steel and low alloy steel components of the generator. To minimize corrosive effects, those solvents are typically provided with low concentrations of their active chelate ingredients. Despite the use of low concentrations, it is believed that such chemicals still induce a significant amount of new corrosion on the metallic components of the generator. Moreover, the use of low concentrations protracts the time it takes for these cleaning agents to work, and often necessitates exposing the interior of the secondary side to multiple solvent baths along with multiple rinse cycles. For example, in one of the most widely accepted prior art chemical cleaning methods, it may be necessary to introduce and remove an iron solvent twice within the steam generator, and to introduce and remove a copper solvent as many as six times. Such multiple solvent baths, along with the various rinse cycles which they necessitate, can cause a single chemical cleaning operation of a steam generator to last 120 hours or more. A utility may lose a million dollars in revenue for each day of down time of a nuclear steam generator. Thus, it can readily be appreciated that the cost of these accepted chemical cleaning operations is quite high, particularly when one considers that the total price of such an operation must also include the cost of chemicals, the setting up of the recirculation and heating equipment (operable up to 200° F.), and the disposal of large volumes of the spent iron and copper solvents and rinse solutions, which are radioactive liquid waste, removed from the radioactive interior of the secondary side of the generator. Thus, the use of low concentration iron and copper solvents only partially solves the problem of unwanted solvent-induced corrosion while significantly enlarging the time, expense and waste volume associated with the cleaning operation.

Still another shortcoming of conventional chemical cleaning operations is that such operations are not sufficiently effective in removing tightly ensconced iron oxide and copper impurities from the numerous crevice regions within the secondary side of the generator. Part of the ineffectiveness results from the fact that tightly packed impurities in small spaces do not allow the chemical solvent a sufficient opportunity to penetrate and to contact large surface areas of such impurities. It is believed that the insoluble fractions of the scale and sludge and other deposits collect as residues at the surfaces of these tightly ensconced deposits and block or hinder penetration of the chemical cleaning solution beyond the surface of the deposit. The surface residues stop or at least significantly reduce the dissolution of the underlying deposits.

Pressure pulse cleaning methods are also known and used in an effort to mechanically loosen and remove such stubborn deposits of scale and sludge in small spaces in the interior of the secondary side of the steam generator. In this type of cleaning method, the generator is shut down, taken off-line and drained. Next, enough demineralized water is introduced into the secondary side to completely submerge the tubesheet and bundle of heat exchanger tubes that are disposed in the secondary side. Pressurized pulses of inert gas are then continuously introduced into the demineralized water near the tubesheet of the generator as the generator is being filled. The pulses of gas create explosive shock waves in the demineralized water within the secondary side that impinge on all the heat exchanger components submerged within the water, and tend to loosen, dislodge and even fluidize the sludge and deposits on and/or between the heat exchanger tubes, the support plates, the tubesheet and in particular at the crevice regions of the secondary side. The dislodged and fluidized sludge and deposits are removed from the demineralized water by recirculating them through a filter and optionally a deionizer during the pressure pulsing operation. Preferably, the pulses of the debris-removing shock waves are continuously introduced into the demineralized water not only during the recirculation step, but also during the time that the demineralized water is introduced into and drained from the secondary side.

Pressure pulse cleaning as described induces no new, unwanted chemical corrosion of metallic surfaces at the secondary side of the steam generator, and therefore represents a substantial advance in the art. Pressure pulse cleaning is rapidly gaining acceptance in the nuclear power industry as an alternative to chemical cleaning methods. But, while pressure pulse cleaning is capable of removing a great deal of sludge and deposits, it is rarely effective in removing the tightly ensconced deposits that accumulate in the crevice regions of the generator. Sludge lancing is often performed on the tubesheet regions prior to pressure pulsing to remove larger accumulations of sludge and deposits on the top of the tubesheet. Sludge lancing is also performed after the pressure pulsing operation has been completed to remove loosened deposits that have fallen out of solution into the tubesheet. Unfortunately, such sludge lancing adds to both the time and expense of the pressure pulsing cleaning operation.

Efforts have been made to combine chemical cleaning methods and pressure pulse cleaning methods in one operation as suggested in aforementioned U.S. Pat. No. 5,154,197 (Auld, et al.), namely by generating shock waves in a liquid chelate-containing cleaning solution. However, improved chemical cleaning methods are still being sought to find more desirable chemical cleaning solutions which have enhanced activity and less corrosive tendencies.

What is needed is an improved cleaning method which maintains all of the advantages associated with known chemical and pressure pulse cleaning techniques, but which avoids the drawbacks and disadvantages associated with each. Ideally, such a cleaning method would be faster and would not generate large volumes of liquid radioactive waste. It would further be desirable if the cleaning method reduced the probability that the cleaning agents would promote new corrosion within the steam generator. Finally it would be advantageous if a new technique could further reduce the need for sludge lancing.

3. SUMMARY OF THE INVENTION

It is an object of the invention to provide an improved chemical cleaning method to remove scale, sludge, corrosion and other deposits and debris from the interior of heat exchange vessels, in particular the interior of the secondary side of a nuclear steam generator, which method is effective in cleaning in a short period of time, generates a minimum amount of liquid radioactive waste, and does not promote new corrosion within the steam generator.

Generally speaking, the invention is an improved method for chemically removing scale, sludge, corrosion and other deposits from the interior of a heat exchanger vessel such as the interior of the secondary side of a nuclear steam generator that eliminates or at least ameliorates shortcomings associated with the prior art. The method of the invention generally comprises the steps of introducing an aqueous solution of water soluble, strongly basic amines into the interior of a heat exchanger vessel, which may be the secondary side of a nuclear steam generator, to dislodge, dissolve and fluidize the sludge and deposits at the interior of the secondary side, to inhibit resettling of solubilized or loosened sludge and deposits within the interior of the secondary side, and to further inhibit reforming of new sludge and deposits within the interior of the secondary side.

In the preferred method of the invention, the method generally comprises introducing an aqueous solution of water soluble, strongly basic amines into the interior of the heat exchanger vessel, generating a series of pressure pulses within the aqueous solution of water soluble, strongly basic amines filled within the interior of the secondary side of the nuclear steam generator to create shock waves and displacement in the solution that dislodge, dissolve and fluidize the scale, sludge, corrosion and other deposits, and then removing the chemical cleaning agent therefrom.

In the preferred method of the invention, the secondary side of the steam generator is filled with the aqueous solution of the chemical cleaning agent up to the top of the bundle of the heat exchanger tubes and the chemical cleaning agent is simultaneously recirculated through a filtration system and optional deionizing medium located outside of the vessel of the heat exchanger while pressurized pulses of gas are introduced into the cleaning agent within the vessel. Such recirculation, filtration, and deionization advantageously removes fluidized sludge and corrosion products from the chemical agent during the cleaning operation, thereby denying the opportunity to resettle back down onto the tubesheet or crevice regions within the heat exchanger, which in turn would interfere with the chemical cleaning of the surfaces. The solution is then drained out of the interior of the secondary side of the generator. When optional rinsing agents are used to remove the residual cleaning agents from the interior of the heat exchanger vessel, the same recirculation and pressure pulsing is preferably simultaneously implemented to remove further amounts of undissolved and fluidized sludge and corrosion products. Such pressure pulsing and recirculation further enhances the ability of such chemical agents and optional rinsing agents to thoroughly penetrate all of the crevice regions of the heat exchanger vessel.

The pressure pulses are preferably created by injecting pulses of gas into the liquid chemical agent at a pressure between about 400 and 900 psi, the pressure increasing as the chemical cleaning agent fills the vessel and stabilizing between about 800 and 900 psi during the recirculation, and then decreasing between about 900 to 400 psi when the solution is drained. Preferably, the pressurized pulses are generated at a frequency of one pulse between about 10 and 60 seconds. The use of pressurized pulses ensures the creation of near-explosive shock waves which are capable of breaking up encrustations of sludge and deposits in the crevice region of the heat exchanger vessel, which in turn helps the chemical cleaning agent to envelop, penetrate, intercalate and dissolve or at least dislodge and fluidize these materials.

In prior art chemical cleaning processes, it is necessary to introduce and remove chemical cleaning agents a number of times before the sludge and deposits have been effectively removed from the interior of the heat exchanger vessel. Also in the prior methods such agents have been corrosive in that they promote new and unwanted corrosion. In the improved method of the invention, new types of chemical agents and solutions made from non-corrosive, strongly basic amines enhance the removal of sludge and deposits from the nuclear steam generator without the use of numerous cleaning and rinse cycles associated with conventional chelates and solvents, and without the accompanying new corrosion and waste disposal concerns associated with other prior art methods. Additionally, these new types of chemical agent solutions have a low temperature pH in the region that is passive towards ferritic materials, and therefore, substantially eliminate any secondary corrosive effects in the interior of the secondary side of the nuclear steam generator. Moreover, these chemical cleaning agents used in the method of the invention are steam volatile and thus decompose during later nuclear steam generator operations, further obviating any concern for cleaning agent "residues" inadvertently left after the completion of the cleaning operation.

In the method of the invention, the aqueous solution of a chemical cleaning agent is formed from at least one of the group consisting of lower alkyl amines, preferably having 1 to 10 carbon atoms, most preferably 1 to 6 carbon atoms, lower alkanol amines, preferably having 1 to 10 carbon atoms, most preferably having 1 to 6 carbon atoms, alkoxyalkyl amines, preferably having 1 to 10 alkoxy and alkyl carbon atoms, most preferably having 1 to 6 alkoxy and alkyl carbon atoms, and cyclic imines, preferably cyclic diimines. In the preferred method of the invention, the aqueous solution of chemical cleaning agent is formed from a combination of either a non-corrosive lower alkyl $C_1$–$C_6$ amine, a non-corrosive lower hydroxyalkyl $C_1$–$C_6$ amine, or a non-corrosive lower $C_1$–$C_6$ alkoxy $C_1$–$C_6$ alkyl (or "carrier agent") to promote penetration of the chemical cleaning solution and active agents therein into the crevice regions and particularly into the sludge and deposit matrices accumulated within the secondary side of the nuclear steam generator, and a non-corrosive cyclic diimine (or "intercalation agent") to promote dissolution and intercalation or at least dislodging and fluidization of the scale, sludge and other deposits for removal from within the nuclear steam generator. Use of these cleaning agents further minimize the chance that the aqueous solution will induce any unwanted corrosion within the interior of the steam generator.

The carrier agent is preferably formed from at least one of the group of dimethylamine, ethylamine, 1,2-diaminoethane, and diaminopropane, ethanolamine, 2-methyl-2-amino-1-propanol, 5-aminopentanol, and methoxypropylamine or the like. The intercalation agent is preferably formed from at least one of the group of 1,10-phenanthroline, 2,9-dimethyl-1,10-phenanthroline, 4,7-dimethyl-1,10-phenanthroline, 2,2'-bipyridine, 4,4'-bipyridine, and terpyridine. In the preferred method, the concentration of cleaning agent within the water component of the solution is preferably maintained at less than about 0.5 weight percent, preferably less than about 0.1 weight percent, and most preferably at a concentration between about 0.0001 and 0.01 weight percent, or other suitable concentration to effectively remove the scale, sludge and other deposits.

4. BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the appended claims. In the drawings, FIG. 1 is a cross-sectional view of a Westinghouse-type nuclear steam generator with the exterior walls cut away in portions, showing the interiors of both the primary side and secondary side;

5. DETAILED DESCRIPTION OF THE PREFERRED EMBODIMENTS OF THE INVENTION

Figure 1:
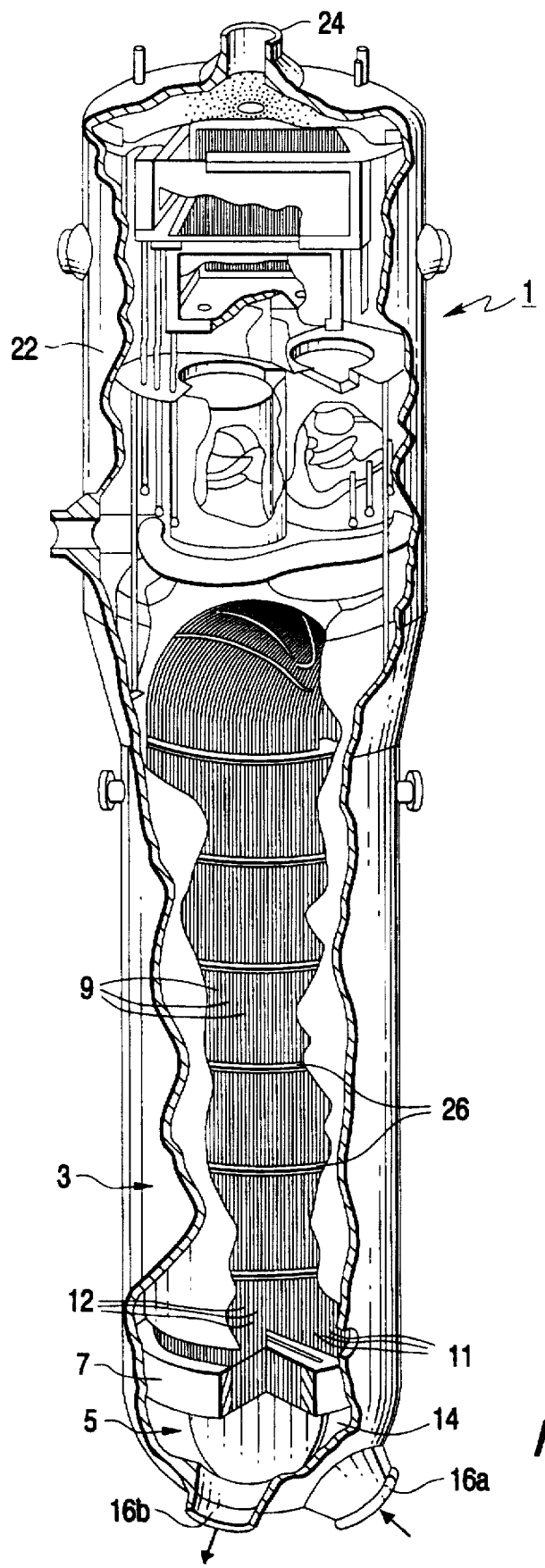
Figure 2:
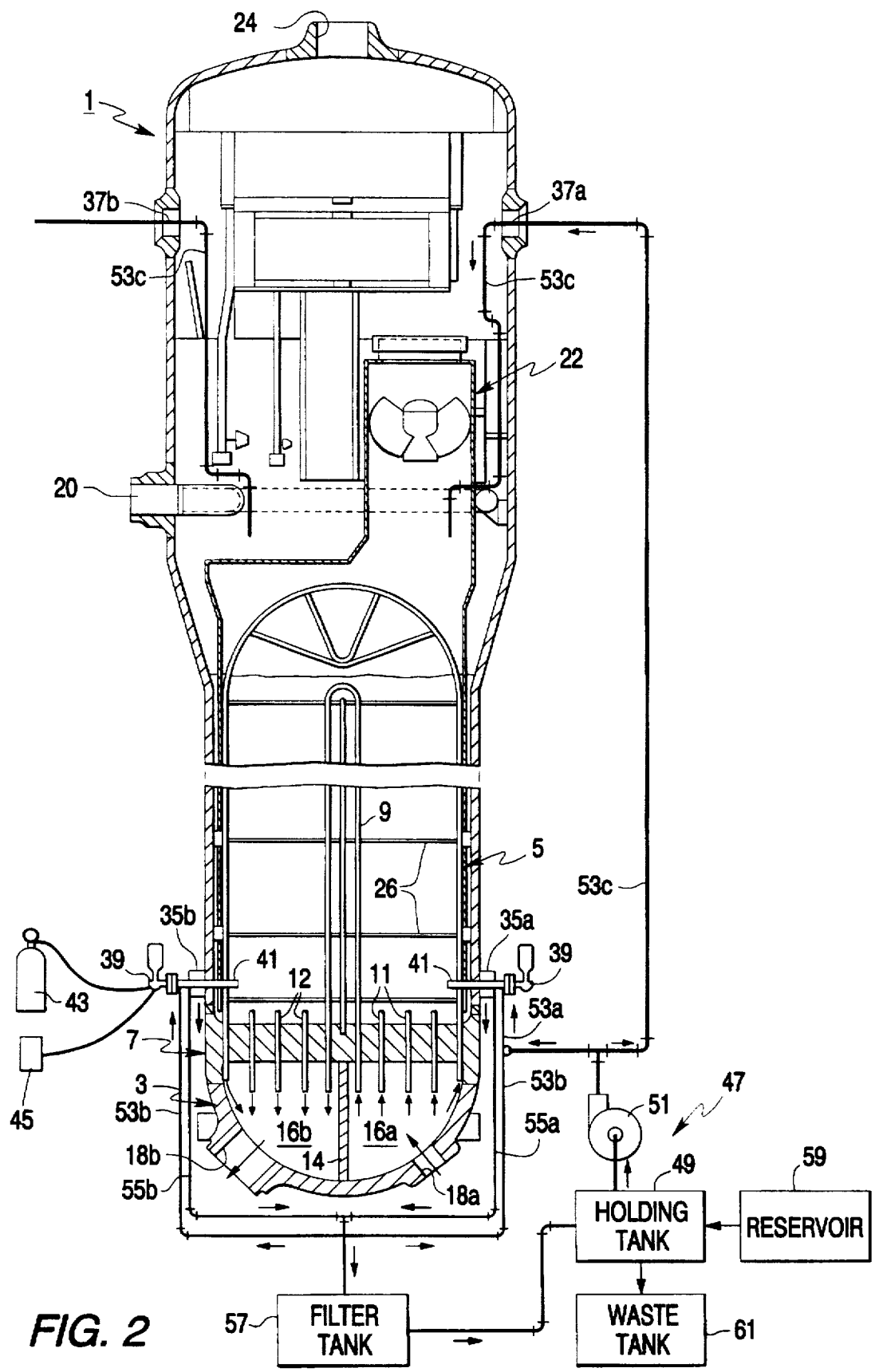
FIG. 2 is a generalized, cross-sectional view of a nuclear steam generator of the type illustrated in FIG. 1, showing the interiors of both the primary side and secondary side, and further including a schematic of the recirculation system used in the preferred method of the invention.

With reference now to FIGS. 1 and 2, the improved chemical cleaning method of the invention is particularly useful in cleaning the interior of a nuclear steam generator (1). Such generators (1) include a bowl-shaped primary side (3) at their bottom portions, and a cylindrically-shaped secondary side (5) in their middle portions which are hydraulically separated by means of a tubesheet (7). Heat is conducted from the primary side (3) to the secondary side (5) through a number of heat exchanger tubes (9), each of which is shaped like an inverted U. Each tube (9) includes an inlet end (11) and an outlet end (12) which are mounted in bores in the tubesheet (7) A divider plate (14) divides the bowl-shaped primary side (3) into two quadri-spherical chambers known as channel heads (16a, 16b) in the art. The inlet ends (11) of all of the heat exchanger tubes (9) communicate with the right-hand channel head (16a), while the outlet ends (12) of all of these heat exchanger tubes (9) communicate with the left-hand channel head (16b). Manways (18a, 18b) afford access to the channel head (16a, 16b) respectively. In the secondary side (5), a feed water inlet (20) is provided for admitting non-radioactive and purified water over the bundle of U-shaped heat exchanger tubes (9) so as to immerse the same. Disposed above these tubes (9) is a steam drying assembly (22) which captures and returns water vapor entrained in the steam created by the generator (1) back into the feed water that immerses the heat exchanger tubes (9). An outlet port (24) at the top of the steam generator (1) conducts dry steam to the blades of a turbine (not shown) that is connected to an electrical generator (not shown). Finally, a number of vertically-spaced support plates (26) are disposed along the length of the secondary side (5) of the steam generator (1) for laterally supporting the legs of the U-shaped heat exchanger tubes (9). As is best seen in FIGS. 3a and 3b, each of these support plates (26) includes a plurality of bores (28) through which the heat exchanger tubes (9) extend.

In operation, hot radioactive water from the reactor core (not shown) is admitted into the channel head (16a) and from there flows upwardly into the inlet ends (11) of each of the heat exchanger tubes (9). This hot water flows upwardly through the inlet legs of each of the tubes (9) (known as "hot legs" in the art), continues flowing around the bend of each of the tubes (9), and from there flows down through the outlet legs (known as "cold legs" in the art) and then out through the outlet ends (12) of the heat exchanger tubes (9) and into the outlet channel head (16b), where it is ultimately recirculated back to the core of the reactor.

The hot, radioactive water from the primary side (3) transfers much of its heat through the walls of the heat exchanger tubes (9) and into the non-radioactive water that surrounds these tubes (9). This causes the non-radioactive water to boil, and to create the steam which is ultimately conducted out of the outlet port (24) of the steam generator (1) for use in electrical power generation.

Figure 3A:
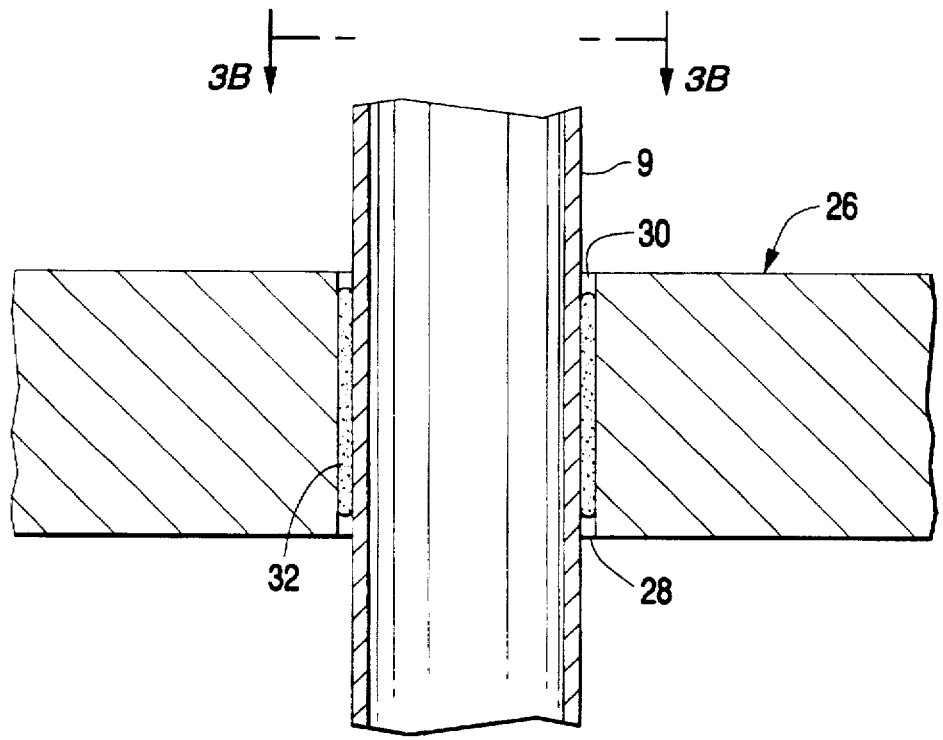
FIG. 3a is a cross-sectional side view of one of the heat exchanger tubes used in the nuclear steam generator illustrated in FIG. 2, showing how this tube extends through a bore in a support plate, and how scale, sludge, corrosion and other deposits accumulate in the annular space between the tube and the bore in the support plate.
Figure 3B:
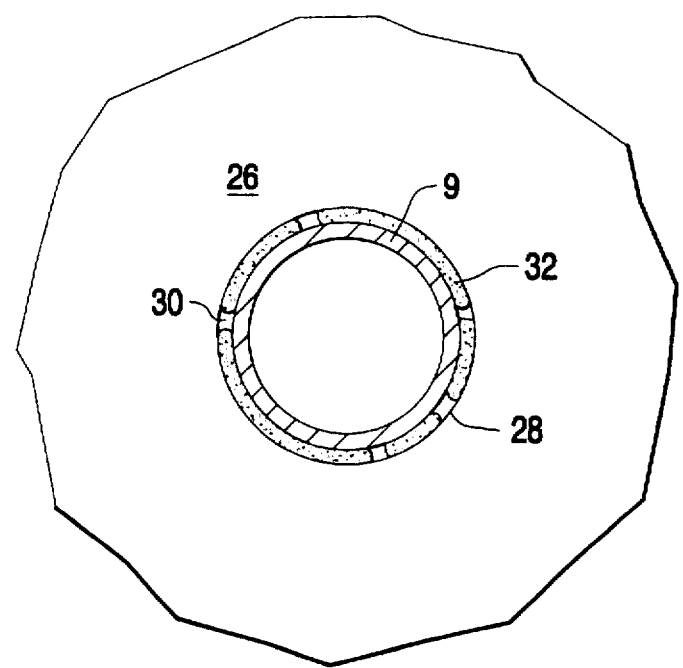
FIG. 3b is a plan view of the heat exchanger tube illustrated in FIG. 3 along line 3b—3b; and, FIG. 4 is a schematic diagram of the recirculation system used to implement the improved chemical cleaning method of the invention.

The manner in which scale, sludge, corrosion products and other deposits and debris accumulate in the crevice regions of the steam generator (1) is best understood with reference to FIGS. 3a and 3b. Between the heat exchanger tubes (9) and, the bores (28) in the support plates (26) is a narrow, annular space (30). This annular space (30) provides a relatively constricted flow path for the non-radioactive water that is in a constant state of circulation around these tubes (9) during the operation of the steam generator (1). The resulting limited circulation can allow water to boil out of the space faster than the surrounding ambient water can re-envelop the heat exchanger tube (9). As a result of this "dry boiling," any impurities present in the water in the secondary side (5) are plated out or precipitated out or left as scale on the surfaces of this narrow annular space (30), forming deposits of scale, sludge, corrosion and other debris (32). As this sludge and debris (32) accumulates, recirculation through the annular space (30) is further retarded, which in turn accelerates the accumulation of more sludge and debris (32) in this region. Ultimately, the scale, sludge and debris (32) can completely fill the annular space (30). Furthermore, scale, sludge, debris and corrosion and other deposits are also accumulated in the free span region of the heat exchanger tubes (9) in the area between the support plates (26). Chemical analysis has shown that the primary components of the sludge and debris (32) include magnetite ($Fe_3O_4$), elemental copper, and copper oxide. Such sludge and debris accumulations can promote the occurrence of corrosion in the outer walls of the heat exchanger tubes (9) in the vicinity of the support plates (26), which in turn may cause these tribes (9) to crack, thereby contaminating the non-radioactive water of the secondary side (5) with the radioactive water from the primary side (3) of the generator (1). The same destructive phenomenon can also occur in the annular spaces (not shown) between the bores and the tubesheet (7) and the outer walls of the heat exchanger tubes (9) that extend through these bores.

One of the principal purposes of the chemical cleaning method of the invention is to remove such sludge and debris (32) from crevice regions such as the annular space (30) along with the products of any corrosion which a sludge might have started. To this end, the method of the invention involves at least flushing and rinsing with a non-corrosive chemical cleaning solution, and preferably generating pressure pulses in the non-corrosive chemical cleaning solution. The chemical cleaning solution includes an aqueous solution formed from at least one of the group consisting of lower alkyl amines, lower hydroxyalkyl amines and cyclic diimines introduced into the secondary side (5) of the steam generator (1) in order to loosen, dislodge, and fluidize sludge and debris (32) while the active compounds within the chemical cleaning solution intercalate and dissolve the iron, copper and other compounds within such debris.

FIG. 2 illustrates a preferred mode of implementing the chemical cleaning method of the invention, wherein both pressure pulse generators and a chemical recirculation system are installed within the lower hand holds (35a, 35b) and upper manways (37) of the nuclear steam generator (1). More specifically, a pressure pulse generator (39) having a nozzle (41) for emitting a pressurized pulse of gas is detachably secured within each of the lower hand holds (35a, 35b). A source of pressurized gas (43), which may be a compressed bottle of nitrogen or air or other inert gas, is connected to each of the pressure pulse generators (39), as is a pulser control unit (45) which periodically actuates the pulser generator (39) to discharge a volume of compressed gas through the nozzle (41). The pressure pulse generators (39) can each include a Model PAR 600B air gun manufactured by Bolt Technology, Inc. of Norwalk, Conn., and the pulser control unit (45) is a Model FC 100 controller manufactured by the same company.

Nozzles (41) are schematically illustrated as being horizontally-oriented. They are more preferably canted at a 30° angle with respect to the upper surface of the tubesheet (7) so as to minimize the momentary forces that the shock waves create by the pulses of gas applied to the heat exchanger tubes (9) nearest to the open ends of the nozzle (41). Preferably, the firing cylinder of each of the pressure pulse generators (39) contains between 75 and 100 cubic inches of pressurized gas.

Figure 4:
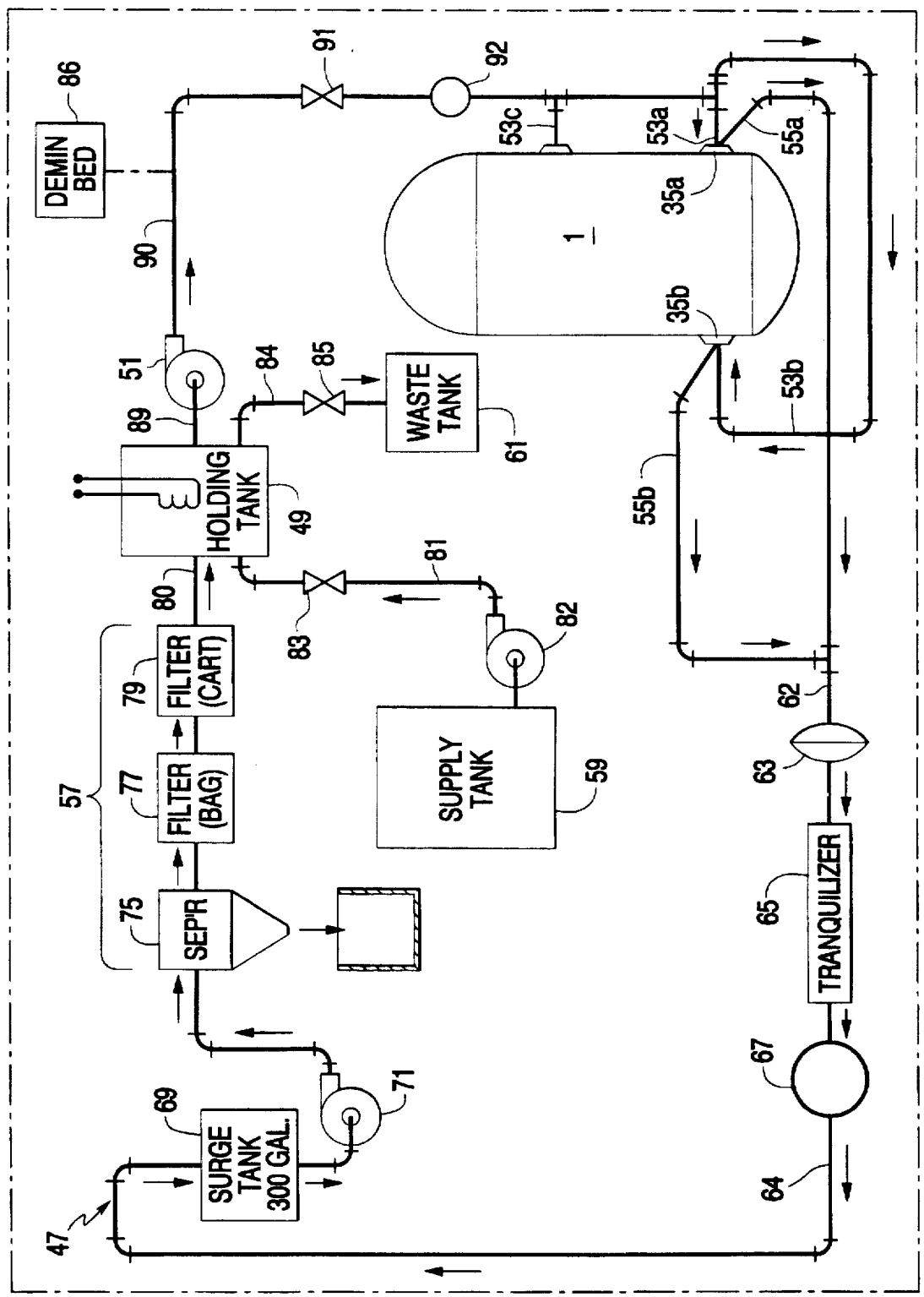

With reference to both FIGS. 2 and 4, the recirculation system (47) that is preferably used to implement the method of the invention generally comprises a holding tank (49) for holding and optionally heating the liquid chemical cleaning agents, if desired (although the liquid chemical cleaning agents of the invention effectively operate at ambient temperature) circulated through the secondary side (5) of the generator (1), a circulation pump (51) for creating the pressure differential necessary to circulate such cleaning agents into and out of the secondary side (5), and three inlet conduits (53a, 53b, 53c) for introducing the liquid chemical cleaning agent through the hand holds (35a, 35b) and upper manways (37) of the secondary side (5). Further included are a pair of outlet conduits (55a, 55b) for removing liquid chemical cleaning agents from the interior of the secondary side (5), a filter bank (57) for removing undissolved sludge and debris entrained in the liquid chemical cleaning agents removed from the secondary side (5), a chemical cleaning solution (59) for supplying chemical cleaning agents to the holding tank (49), as well as optional rinsing and passivation agents, if desired (although not required in the method), and a waste tank (61) for collecting spent chemical cleaning agents from the holding tank (49). In addition, the recirculation system can optionally include ion exchange columns filled with ion exchange resins in a demineralizer bed (86) (shown in phantom), if desired, somewhere downstream of the filtration system to remove the dissolved ionic species from the cleaning solution prior to recirculation so that there will be no opportunity for such dissolved ionic species to reenter the secondary side (5) of the generator and create new sludge and deposits. However, such ion exchange clean-up of the recirculating solution is less preferred so as to avoid the generation of more waste to be disposed.

FIG. 4 illustrates the recirculation system (47) in more detail. Specifically, outlet conduits (55a, 55b) converge into a single inlet conduit (62) which in turn is connected to a diaphragm pump (63). The use of a diaphragm-type pump (63) is preferred at this point in the recirculation system (47) since the liquid cleaning agent withdrawn through the outlet conduits (55a, 55b) may include large particles of suspended sludge and debris which, while easily handled by a diaphragm-type pump, could damage or even destroy a centrifugal or positive displacement pump. The outlet of the diaphragm (63) is connected to the inlet of a tranquilizer (65) by way of a conduit (64). The purpose of a tranquilizer (65) is to even out the pulsations in the liquid chemical agent created by the diaphragm pump (63) so that a flow meter (67) located downstream of the tranquilizer (65) can reliably indicate the rate of flow of liquid chemical cleaning agent through the conduit (64). Located downstream of flow meter (67) is a surge tank (69). The purpose of the surge tank (69) is to accumulate the flow of liquid cleaning agent generated by the diaphragm pump (63) and to smoothly deliver it to the inlet of recirculation pump (71). The pump (71) in turn generates a sufficient pressure head in the recirculating chemical agents to drive it through the filter bank (57), which includes a cyclone separator (75), a bag filter (77), and a cartridge filter (79). When the liquid chemical agent enters the filter bank (57), a substantial portion of the sludge and other debris suspended in the agent is centrifugally flung out of the agent as it flows through the cyclone separator (75). Located downstream of the cyclone separator (75) is the one to three micron bag filter (77) that is serially connected to the one micron cartridge filter (79). These filters (77,79) remove small particulate matter which still might be suspended in the chemical cleaning agent after it passes through the cyclone separator (75).

A conduit (80) connects the filter bank (57) to the inlet of the previously mentioned holding tank (49). As a schematically illustrated FIG. 4, the holding tank (49) includes at least one heater coil for optionally heating the recirculating chemical agent to a desired temperature. As has been previously indicated, the holding tank (49) is connected to a chemical cleaning agent supply reservoir (59) by means of a conduit (81). A pump (82) in conduit (81) generates the pressure differential necessary to transfer the contents of the reservoir (59) into the holding tank (49). A valve (83) is further provided in the conduit (81) for regulating the flow of fresh cleaning agents or rinsing agents into the holding tank (49). The waste tank (61) is connected to the holding tank (49) by means of a conduit (84). If the level of liquid within the waste tank (61) can be made to be lower than the level of liquid in holding tank (49), no pump is necessary in the conduit (84) as the contents of the tank (49) can be made to drain into the tank (61). A valve (85) is provided in the conduit (84) to the control the rate of such draining. The purpose of the waste tank (61) is to remove spent cleaning and other agents from the holding tank (49), and to temporarily "park" these agents until such time as they may be disposed of properly. Finally, the holding tank (49) communicates with the previously mentioned recirculation pump (51) by way of an outlet conduit (89). The outlet of a pump (51) is in turn connected to the outlet conduit (90) which communicates with the previously mentioned generator inlet conduits (53a, 53b, 53c) by way of another flow meter (92). While the supply (59) and holding (49) tanks are shown as each being a single tank, they may in fact comprise two or more tanks, respectively, that separately contain different cleaning agents used in the method of the invention.

In the first step of the preferred method of the invention, steam generator (1) is taken off-line, and all of the water is drained out of both the primary side (3) and secondary side (5). Depending upon the condition of the steam generator (1), a technique known in the art as sludge lancing may be employed to remove loose deposits of sludge that have accumulated over the tube sheet (7) and support plates (26) of the steam generator (1). If the deposits are several inches thick, sludge lancing in accordance with known prior art techniques is carried out. Sludge lancing involves the use of a high velocity jet of water to dislodge and flush out this sludge. There are two advantages associated with a sludge lancing step at this juncture. First, such sludge lancing expedites the entire cleaning operation by quickly removing what might amount to up to three to four inches of sludge and debris that, while loosely deposited on the tube sheet (7) and other areas of the generators (1), would tend to hydraulically isolate crevice regions such as the annular spaces (30) between the bores (28) and the support plates (26) and the heat exchanger tubes (9) from the penetrating and cleaning action of any surrounding cleaning agent. Secondly, with sludge lancing, the potency of the active chemical compounds in the chemical cleaning agents is not unnecessarily wasted on the less adhered metals and metal compounds of the sludge, much of which can be relatively easily and quickly removed by mechanical cleaning techniques. This in turn allows the chemical strength of these cleaning compounds to be concentrated, especially at the crevice regions in the tubesheet (7) and at the support plate (26) interfaces within the secondary side (5), where such strength is needed most, as well as in the free span region of the heat exchanger tubes (9).

In either case, the next step of the method is to install mounting plates (not shown) which secure the nozzles (41) of the pressure pulse generators (39) within each of the lower hand holds (35a, 35b) and to further install the chemical agent outlet conduit (90) through the upper manways (37a, 37b) into position over the bundle of heat exchanger tubes (9).

In the next step of the method, one or more chemical cleaning agents is introduced into the interior of the secondary side (5) of the steam generator from the holding tank (49), and fills the secondary side (5) with the cleaning solution.

The chemical cleaning solution is a non-corrosive, aqueous solution, preferably of demineralized water, containing cleaning agents including a carrier agent and/or an intercalation agent. The carrier agent (i.e., short chain aliphatic amines) includes at least one compound from the group of lower alkyl amines, most preferably $C_1$–$C_6$ alkyl amines, lower alkanol amines, most preferably $C_1$–$C_6$ alkanol amines, and lower alkoxyalkyl amines, most preferably $C_1$–$C_6$ alkoxy $C_1$–$C_6$ alkyl amines, and combinations and derivatives thereof. The intercalation agent includes at least one compound from the group of cyclic diimines. Most preferably, the aqueous cleaning solution contains at least one carrier agent and at least one intercalation agent. The concentration of the cleaning agents within the aqueous solution is preferably less than 0.5 weight percent, more preferably less than 0.1 weight percent, even more preferably between about 0.0001 and 0.01 weight percent, most preferably between about 0.0005 and 0.005 weight percent.

Examples of lower alkyl amines which are suitable for use in the method of the invention include dimethylamine (DMA), ethylamine, 1,2-diaminoethane (DAE), and diaminopropane (DAP). Examples of lower alkanol amines which are suitable for use in the method of the invention include ethanolamine, 2-methyl-2-amino-1-propanol (AMP), and 5-aminopentanol (5-AP). An example of a lower alkoxy alkyl amine which is suitable for use in the method of the invention includes 3-methoxypropylamine (MPA). Other short chain amines which can be used in the method of the invention will be apparent from the foregoing examples.

Examples of cyclic diimines which are suitable for use in the method of the inventioninclude 1,10-phenanthroline, 2,9-dimethyl-1,10-phenanthroline,4,7-dimethyl-1,10-phenanthroline, 2,2'-bipyridine, and 4,4'-bipyridine, and terpyridine. Other cyclic imines which can be used in the method of the invention will be apparent from the foregoing examples.

While a cleaning solution including one or more of the group of the aforementioned non-corrosive, water soluble, strongly basic amines may be used in the method of the invention, a mixture of at least one of the lower alkyl amines, or their hydroxy or alkoxy derivatives and at least one of the cyclic diimines is the most preferred mode of implementing the method of invention. While the theory of the enhanced cleaning action of these compounds is not completely understood, it is believed that the aforementioned non-corrosive, highly water soluble, strongly basic lower alkyl amines, lower alkanol amines, and/or lower alkoxyalkyl amines have small molecular size and high mobility to penetrate the deposit matrix of the sludge and debris on the heat exchanger surfaces. Moreover, it is further believed that these small molecules act as a carrier for the non-corrosive, strongly basic cyclic diimine larger molecules which have the ability to disrupt crystal bond lengths in the sludge and debris matrix by a process known as intercalation, thereby dissolving or at least dislodging and fluidizing the sludge and debris from the heat exchanger surfaces into the chemical cleaning solution. Thus, when used in combination, the small molecules will penetrate the sludge and deposit matrix and bring the larger molecules to the sludge and deposit site where intercalation can be used to weaken the bonding of sludge and deposits to the surfaces of the interior of the heat exchanger vessel. It is also believed that the intercalation agents disrupt the scale by "growing" bond lengths in some of the hydrothermal minerals present in the sludge and deposits which in turn causes the scale to loose integrity and becomes more easily dislodged and dislocated during the cleaning method. Furthermore, the cleaning agents advantageously have a low temperature pH in the region that is passive towards ferritic materials, and therefore, substantially eliminate any secondary corrosive effects in the interior of the secondary side of the nuclear steam generator. Moreover, these chemical cleaning agents used in the method of the invention are steam volatile and will decompose during nuclear steam generator operations, thereby further obviating any concern for cleaning agent "residues" inadvertently left after the completion of the cleaning operation.

In the next step of the preferred method of the invention, the chemical cleaning solution whose composition is set forth above is transferred from the supply reservoir tank (59) to the holding tank (49) via conduit (81) by opening valve (83) and actuating pump (82). The heater coil within the holding tank (49) can be actuated, if desired, to bring the temperature of the cleaning solution to a desired value. Valve (91) is then opened, and recirculation pump (51) is actuated so that the chemical cleaning solution is conducted through the outlet conduit (90), through flow meter (92) and finally into inlet conduits (53a, 53b, 53c). As soon as a sufficient amount of cleaning solution has accumulated within the secondary side (5) to completely submerge the nozzles (41), under approximately three feet of liquid, each of the pressure pulse generators (39), the pressure pulse generators are actuated to commence the introduction of pressurized pulses of nitrogen or other inert gas into the chemical cleaning solution in order to generate shock waves that effectively loosen and dislodge sludge and other debris from the metallic surfaces within the secondary side (5). The frequency of pressure pulses generated by the pressure pulse generators (39) take place at intervals of between ten and sixty seconds, and is preferably one pulse every ten seconds.

Initially, the shock waves are introduced by pulses of gas pressurized to about 400 psi. As the level of the chemical cleaning solution rises, the discharge pressure used in the pressure pulse generators (39) is increased to about 900 psi when the level of the chemical cleaning solution within the secondary side (5) has reached its highest level, at which time it substantially submerges all but the bent portions of the U-shaped heat exchanger tubes (9). This proportionate increase in the pressure of gas pulses counteracts a tendency of the gradually increasing level of the hydrostatic pressure of the solution at the bottom of the secondary side (5) to reduce the intensity of the shock generated by the pressure pulse generators (39).

The chemical cleaning solution is allowed to circulate through recirculation system (47) while at its maximum level within the secondary side (5) for a period of between about 12 and 24 hours or less. In total, the filling, circulation and draining of the chemical cleaning solution in the preferred method of invention takes between 20 and 40 hours or less. All during this time, the pressure pulse generators (39) continue to discharge pulses of pressurized nitrogen or other inert gas in the chemical cleaning solution circulating within the secondary side (5) at a frequency of about once every ten seconds. While the filling step may be implemented with a flow rate through the inlet conduit of as little as between about 25 and 100 gallons per minute, a relatively fast flow rate of between about 75 and 500 gallons per minute is preferred in order to shorten the total amount of time required for the method to be completed.

Finally, the chemical cleaning solution is drained from the secondary side (5) by accumulating it within the holding tank (51) and then discharging it into the waste tank (61) through conduit (84) and valve (85). All during this time, the pressure of the gas used in the pressure pulse generators (39) is lowered from 900 psi to about 400 psi until there is only approximately again three feet of chemical cleaning solution standing over the nozzles (41) over the pressure pulse generator (39).

In the preferred method of the invention, pressure pulsing is performed during the introduction, circulation, and removal of the chemical cleaning solution and other rinses in order to advantageously contract the time required for the chemical cleaning of the secondary side (5). While less preferred it may be desirable to repeat the filling, circulation, and draining steps to effectuate enhanced cleaning. Furthermore, sludge lancing may again be performed at the completion of this cycle.

The preferred method of the invention results in the substantial shortening of time from the loosening, dislodgement and fluidization of the insoluble components of the sludge and other debris as the chemical cleaning solution dissolves, dislodges and fluidizes the magnetite, elemental copper, copper oxide and other mineral components of the sludge and the debris, thereby giving the chemical cleaning solution continuous free access to the sludge being removed. This is a particularly important mechanism in the crevice regions such as the previously described between the annular spaces (30) between the heat exchanger tubes (9) and the bores (28) within the support plates (26), where the static retention of insoluble components of sludge and other debris can retard if not stop altogether dissolution of the components of the debris and sludge. A related mechanism which is further believed to accelerate the removal of the sludge and debris is the fact that the shock waves generated by the pressure pulse generator (39) are capable of cracking or otherwise generating fissures in accumulations of sludges and debris that are not initially dislodged and fluidized by these pulses. The generation of such cracks and fissures increases the amount of surface area within these accumulations that come into contact with the chemical cleaning solution thereby hastening its dissolution, intercalation and fluidization. Other helpful mechanisms include the continuous circulation of the chemical cleaning solution within the secondary side (5) by the recirculation system (47), coupled with the continuous, localized agitation of the chemical cleaning solution by the pressure pulse generators (39). The agitation that results from these activities prevents any localized areas of depleted chemical cleaning solution from occurring in any of the areas of the secondary side (5) which promote poor circulation, such as the previously described crevice regions. Still another speed enhancing mechanism is the fact that the extreme agitation of the chemical cleaning solution afforded by the pressure pulse generators (39) helps to mechanically promote the dissolution of hard to dissolve components within the sludge and other debris. A further mechanism for preserving the useful life of the steam generator is the non-corrosiveness of the chemical cleaning solution. The aggregate effect of all these advantageous mechanisms not only shortens the amount of time necessary to conduct the chemical cleaning bath, it further advantageously obviates the need for other cleaning baths which were typically required in the prior art for highly ensconced sludge and debris, and further uses non-corrosive agents which do not promote new corrosion in the system.

After the chemical cleaning solution has been completely removed from both the secondary side (5) of the generator (1), and the holding tank (49), optional rinse and passivation steps, if desired although not required, with demineralized water, hydrazine and ammonia by methods known in the prior art can be accomplished. The rinse and passivation solutions may be admitted from separate supply tanks into the holding tank (49) and from thence into the interior of the secondary side (5), recirculated and removed from the secondary side (5). The purpose of the rinse is to remove residual amounts of chemical cleaning solution which still may be present within the secondary side (5). The passivation agent is used to create a protective, thin oxide coating on all of the exposed metal surfaces within the secondary side (5) in order to retard the occurrence of future corrosion.

Reference can be made to U.S. Pat. Nos. 4,899,697; 4,921,662; 5,006,304; 5,019,329; 5,092,280; 5,092,355; and, 5,154,197 for a further detailed description of the nuclear steam generator structure and pressure pulse cleaning methods. The U.S. patents cited in this disclosure are incorporated herein by reference in their entireties.

The invention having been disclosed in connection with the foregoing embodiments and examples, additional variations will now be apparent to persons skilled in the art. The invention is not intended to be limited to the embodiments specifically mentioned, and accordingly reference should be made to the appended claims rather than the foregoing discussion of preferred embodiments and examples, to assess the spirit and scope of the invention in which exclusive rights are claimed.

What is claimed is:

1. A method for removing sludge and deposits from the interior of a heat exchanger vessel, which comprises:
   introducing an aqueous cleaning solution containing a chemical cleaning agent into said interior of said heat exchanger vessel; and,
   removing said aqueous solution from said interior of said heat exchanger vessel,
   in which said aqueous cleaning solution comprises a cleaning agent from at least one of the group consisting of a carrier agent and an intercalation agent, or a combination thereof, wherein said carrier agent is selected from the group consisting of dimethylamine, ethylamine, 1,2-diaminoethane, and diaminopropane, ethanolamine, 2-methyl-2-amino-1-propanol, 5-aminopentanol, and methoxypropylamine.

2. The method of claim 1, in which said cleaning agent is provided in a concentration of less than 0.1 weight percent of said solution.

3. The method of claim 1, which further comprises:
   generating a series of pressurized pulses within the cleaning solution after said solution has been introduced into the interior of said heat exchanger vessel to create shock waves in said cleaning solution to dissolve, dislodge and fluidize said sludge and deposits.

4. The method of claim 3, in which said pressurized pulses comprises pulses of inert gas.

5. The method of claim 3, in which the frequency of said pressurized pulses is one pulse between about every 10 to 60 seconds.

6. The method of claim 3, which further comprises:

recirculating said cleaning solution through a filter means while said series of pressurized pulses is being introduced into said cleaning solution in order to remove entrained sludge and deposits therein.

7. The method of claim 6, which further comprises:

filling said heat exchanger vessel with said cleaning solution, recirculating said cleaning solution within said interior of said heat exchanger vessel, and draining said cleaning solution from said vessel while continuously introducing said series of pressurized pulses during said filling, recirculating and draining steps.

8. The method of claim 7, in which the pressure of a gas used to create said pressurized pulses is increased from about 400 psi to about 900 psi as the vessel is filled with said cleaning solution during the filling step, maintained at about 900 psi during the recirculation step, and reduced from about 900 psi to about 400 psi when said cleaning solution is drained during the draining step.

9. The method of claim 1, in which said heat exchanger vessel is a nuclear steam generator.

10. The method of claim 1, in which the steps are repeated one or more times.

11. A method for removing sludge and deposits from the interior of a secondary side of a nuclear steam generator, which comprises:

filling the interior of said secondary side with an aqueous solution of a cleaning agent, wherein said cleaning agent is at least one of the group consisting of a carrier agent selected from the group consisting of dimethylamine, ethylamine, 1,2-diaminoethane, and diaminopropane, ethanolamine, 2-methyl-2-amino-1-propanol, 5-aminopentanol, and methoxypropylamine and an intercalation agent is selected from the group consisting of 1,10-phenanthroline, 2,9-dimethyl-1,10-phenanthroline, 4,7-dimethyl-1,10-phenanthroline, 2,2'-bipyridine, 4,4'-bipyridine, and terpyridine, or combinations thereof;

recirculating said aqueous solution within said secondary side while simultaneously introducing a succession of pressurized pulses of gas into said solution to loosen and remove sludge and deposits from the interior surface of said secondary side;

filtering said aqueous solution during said recirculation step to remove sludge and deposits from said solution; and, draining said aqueous solution from said secondary side.

12. The method of claim 11, in which the concentration of the cleaning agent is less than about 0.1 weight percent of said solution.

13. The method of claim 11, in which the concentration of the cleaning agent is between 0.0001 and 0.01 weight percent of said solution.

14. The method of claim 11, in which said pressurized pulses of gas are continuously introduced into said solution during said filling and draining steps.

15. The method of claim 11, in which said aqueous solution is formed from said at least one carrier agent to promote penetration of said solution into a crevice regions within said secondary side and said at least one intercalation agent to promote intercalation, dislocation and fluidization of said sludge and deposits.

16. The method of claim 11, in which the pressure of the gas used to create said pulses is increased from about 400 to 900 psi as the secondary side is filled with said solution, maintained at about 900 psi during said recirculation step, and reduced from about 900 to 400 psi when said cleaning solution is drained.

17. The method of claim 14, which further comprises:

filling and recirculating said aqueous solution a second time while simultaneously filtering said solution and introducing said succession of pressurized pulses of gas into said solution until the density of sludge and deposits entrained within said solution reaches a selected value; and, completing the draining of said solution out of said secondary side.

18. A method for removing sludge and deposits from the interior of a heat exchanger vessel, which comprises:

introducing an aqueous cleaning solution containing a chemical cleaning agent into said interior of said heat exchanger vessel; and, removing said aqueous solution from said interior of said heat exchanger vessel after an effective amount of time to substantially remove said sludge and deposits, in which said aqueous cleaning solution comprises a cleaning agent from at least one of the group consisting of a carrier agent and an intercalation agent, or combination thereof, wherein said intercalation agent is selected from the group consisting of 1,10-phenanthroline, 2,9-dimethyl-1,10-phenanthroline, 4,7-dimethyl-1,10-phenanthroline, 2,2'-bipyridine, 4,4'-bipyridine, and terpyridine.

19. The method of claim 18, in which said cleaning agent is provided in a concentration less than 0.1 weight percent of said solution.

20. The method of claim 18, which further comprises:

generating a series of pressurized pulses within the cleaning solution after said solution has been introduced into the interior of said heat exchanger vessel to create shock waves in said cleaning solution to dissolve, dislodge and fluidize said sludge and deposits.

* * * * *